G. WESTINGHOUSE.
TURBINE BLADING.
APPLICATION FILED OCT. 8, 1908.

990,321.

Patented Apr. 25, 1911.
3 SHEETS—SHEET 2.

WITNESSES:

INVENTOR.
BY George Westinghouse
his ATTORNEY IN FACT.

UNITED STATES PATENT OFFICE.

GEORGE WESTINGHOUSE, OF PITTSBURG, PENNSYLVANIA.

TURBINE-BLADING.

990,321.	Specification of Letters Patent.	Patented Apr. 25, 1911.

Application filed October 8, 1908. Serial No. 456,816.

*To all whom it may concern:*

Be it known that I, GEORGE WESTINGHOUSE, a citizen of the United States, and a resident of Pittsburg, in the county of Allegheny and State of Pennsylvania, have made a new and useful Invention in Turbine-Blading, of which the following is a specification.

This invention relates to elastic fluid turbines and more particularly to blading means for turbines.

It has been found that under certain operating conditions, the rotors and stators of elastic fluid turbines distort and in so doing destroy the small clearances necessary for turbine efficiency. These distortions may result from variations of temperature in the working passages of the turbine and a consequent inequality of temperature strains throughout the length of the turbine; or inherent strains may be set up within the casing or stator by calking the blades in place which, under the influence of temperature variations, cause the stator to warp or distort. These distortions, in conjunction with a tendency on the part of the rotor to rotate about its gravity axis instead of its geometric axis, are apt to seriously damage and even completely wreck a turbine.

An object of this invention has been to overcome the troubles which arise from the necessarily small clearances and the above mentioned distortions of the rotors and stators of turbines.

A further object of this invention has been the production of a base strip and mounting element for the stator blades of the turbine which obviates the necessity of calking the blades in place in the stator and thereby decreases the tendency of the stator to distort.

In carrying out my invention, I mount the stationary blades of the turbine in such a way that they are capable of moving radially to accommodate themselves to the variations in the relative positions of the rotor and stator elements, and I also provide clearance-determining strips for the outer or free ends of the rotating blades which move, with the stationary blades, to accommodate the varying positions of the relatively rotating parts.

Figure 1:
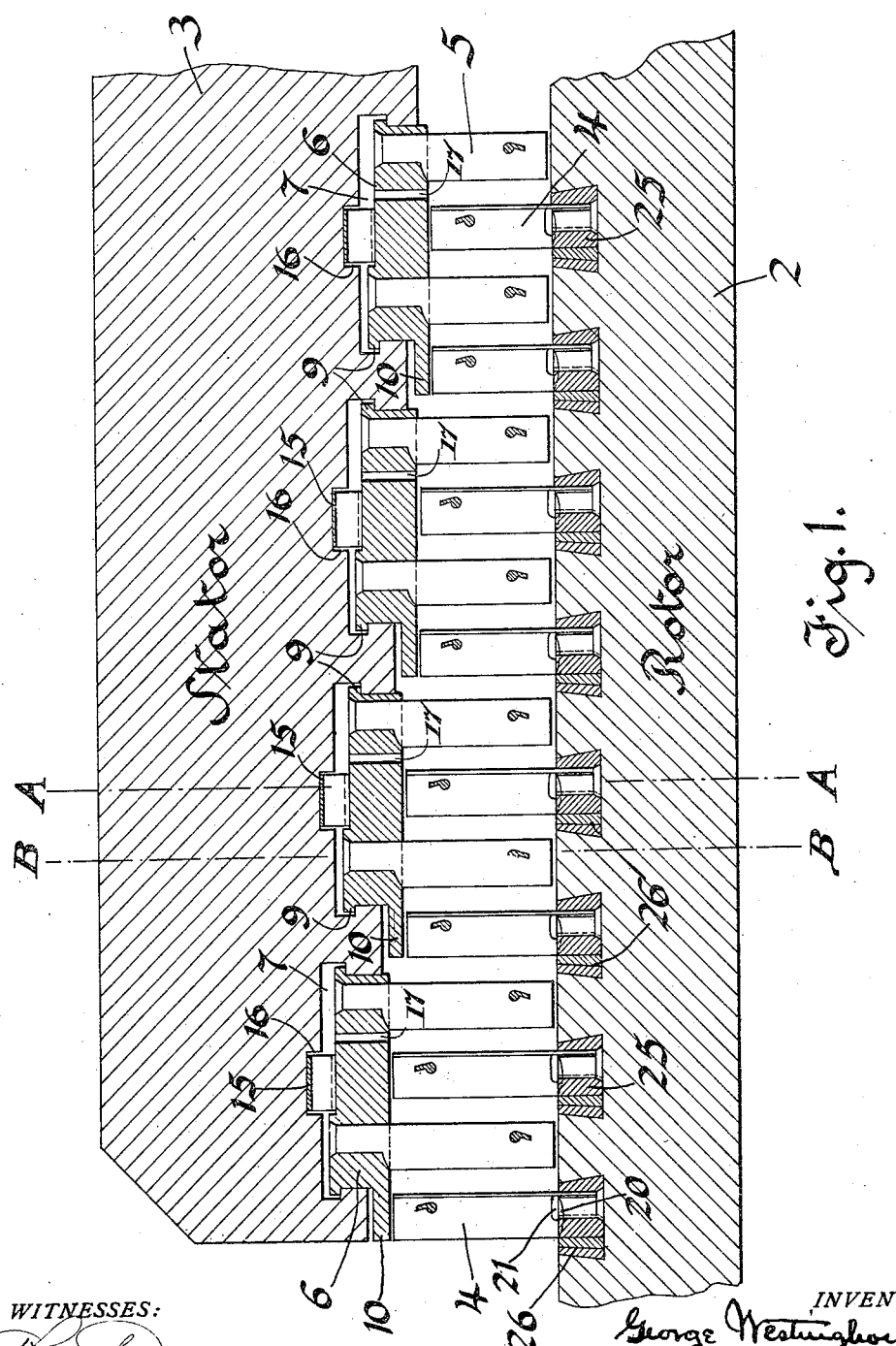
Figure 2:
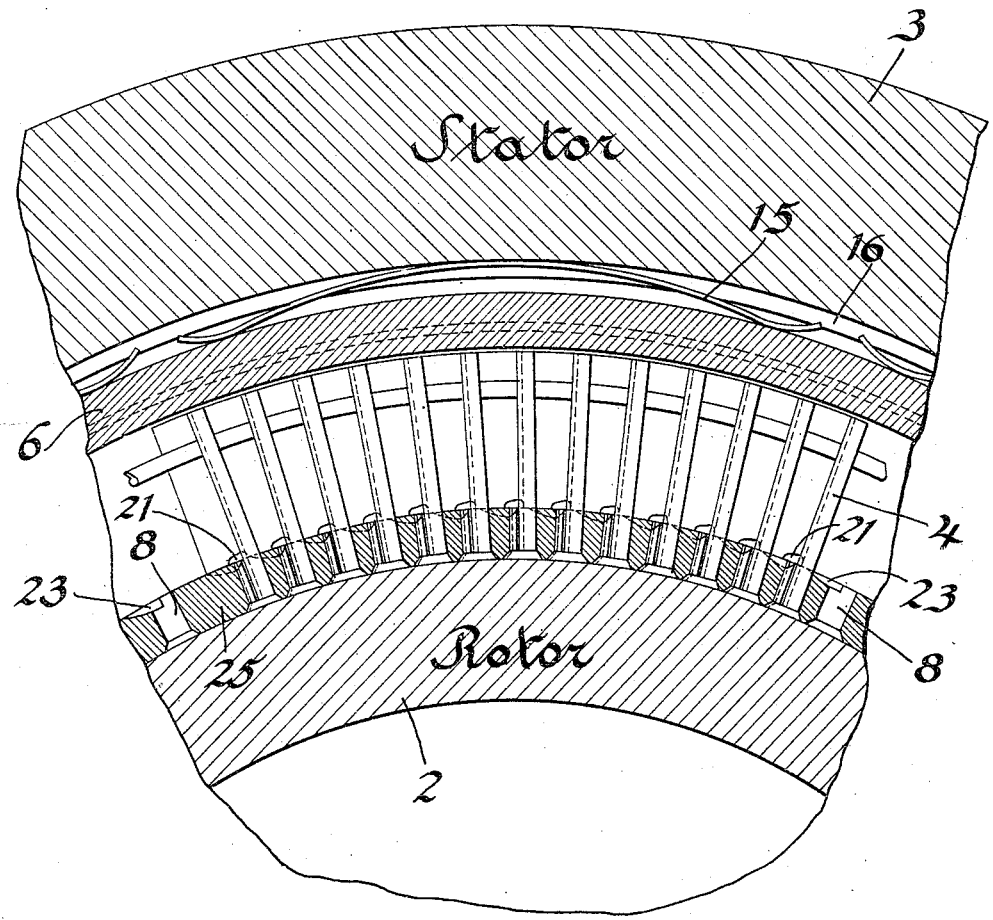
Figure 3:
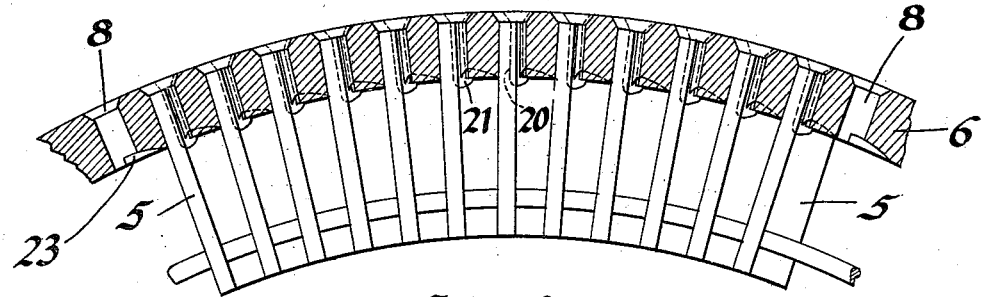
Figure 4:
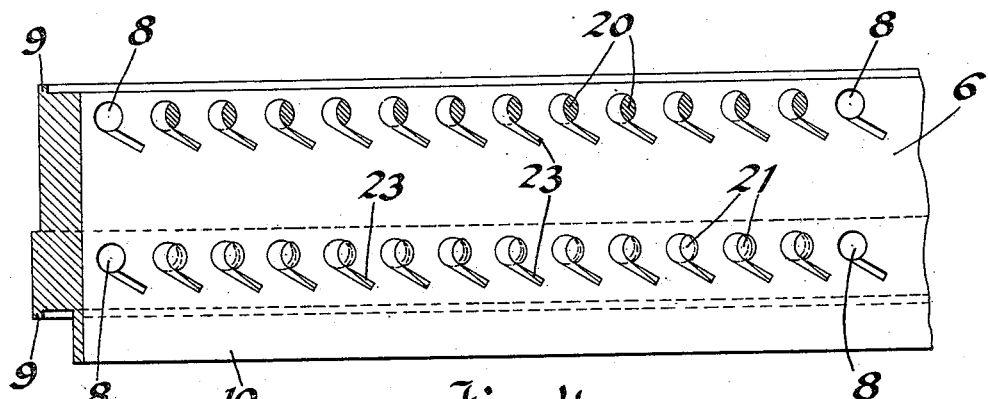
Figures 5, 6, 8, 9, 10:
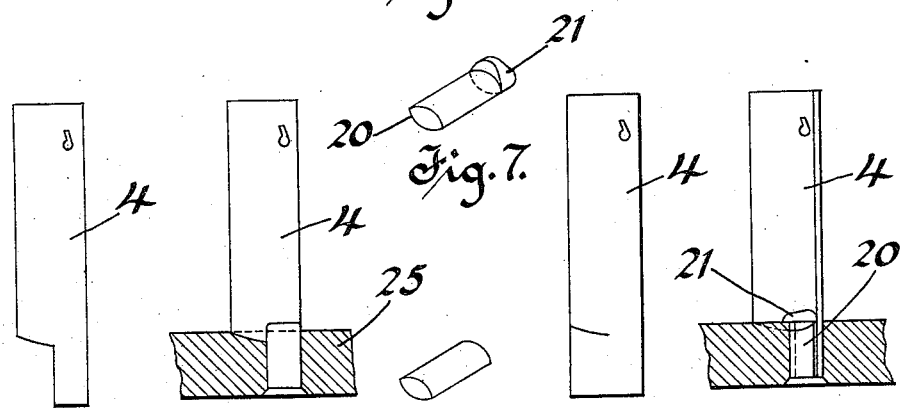

In the drawings accompanying this application and forming a part thereof; Figure 1 is a partial longitudinal section of a turbine and discloses partial sections of the stator and the rotor of the turbine provided with blading embodying my invention; Fig. 2 is a fragmental section of a turbine along the line A—A of Fig. 1; Fig. 3 is a section along the line B—B of Fig. 1 of a portion of a base strip showing a number of blades in place and apertures with the blades removed; Fig. 4 is a plan view of a portion of a base strip; Fig. 5 is an elevation of a blade embodying my invention; Fig. 6 is an elevation of a blade cut in the operation of forming the blade-mounting portion; Fig. 7 is a perspective view of a calking piece employed in my invention in securing the blades to the base strip; Fig. 8 is a modified form of calking piece; Fig. 9 is a partial section of a base strip showing a blade secured in place by means of the calking piece disclosed in Fig. 8; and Fig. 10 is a partial section of a base strip showing a blade secured in place by means of the calking piece disclosed in Fig. 7.

The turbine illustrated as embodying my invention comprises a rotor 2, a stator or inclosing casing 3 and alternate rows of moving and stationary blades 4 and 5, which are respectively mounted on the rotor and stator of the turbine. The moving blades are secured in accordance with my invention in grooves or channels provided in the rotor and the stationary blades are mounted in segments of a ring or arc shaped base strips 6, which are secured in place in undercut channels or grooves 7 formed in the stator. These base strips are rolled or drawn to the desired section and are cut and formed into semi-circular or smaller segments, each of which is provided with two rows of radially-extending and circumferentially alined cylindrical holes 8, into which the stationary blades are mounted, as hereinafter described. The rows of blades secured to each base strip are so spaced that they coöperate with the moving blades mounted on the rotor.

Each segmental base strip is so mounted within one of the grooves 7 that it is capable of a certain amount of transverse motion, relative to the stator, in a plane perpendicular to the axis of the rotor. I accomplish this by providing a circumferentially-extending and laterally-projecting flange 9 on each side of each base piece. These flanges coöperate with the shoulders, formed by undercutting the walls of the grooves 7, in holding the base strip in place and at the same time permit of a certain amount of play. The body portion proper of each base strip 6 forms a sliding fit with the walls of the narrower portion of the mounting groove 7 and the flanges are of such thickness, relative to the depth of the undercut portion of the groove, that the strip is capable of moving inwardly relative to the groove. The portion of each base piece, which projects out of the mounting groove, is provided, on one side with a circumferentially-extending flange 10, which projects laterally into close proximity with the peripheral face of the stator and between the stator and the outer or free ends of an adjacent row of blades 4, thereby forming a clearance or clearance determining strip for those blades and at the same time a protective covering for the stationary blade-carrying element.

That portion of the peripheral face of each base strip adjacent to the outer or free ends of a row of blades 4, which is located and operates between the two rows of blades 5 carried by each strip, forms a clearance-determining surface for the moving blades.

Each base strip is yieldingly held in an operating position by means of a flat spring, or a plurality of flat springs 15, which are mounted in a slot 16 cut in the inner wall of each groove 7 and which operate, between the stator and the base piece, to force the flanges 9 into contact with the shoulders formed by the undercut portion of the grooves 7.

Each strip is so constructed that its blades are so arranged that, when the flanges 9 are held against the shoulders formed by the undercut portions of the grooves 7, the stationary blades, carried by the base piece project into close proximity with the turbine rotor and maintain a desired clearance and one which is equal to the clearance between the outer or free ends of the moving blades and the base piece. With such a construction, if for any reason the relative positions of the rotor and stator are disturbed and the clearances which it is desired to maintain are impaired by the rotor contacting with the free ends of the stationary blades or by the stator distorting and forcing the clearance determining strips in contact with the free ends of the rotating blades, the base strip 6 will move radially outward, under the influence of the contacting force, and flattening a number of springs 15, thereby prevent any serious disturbances. Under such conditions the free ends of the stationary blades will be yieldingly held in contact with the peripheral face of the rotor and the base strip will be yieldingly held in contact with the outer or free ends of the rotor blades.

By cutting the base strips 6 into semicircular segments, or even into smaller segments, a portion only of the blades of each row of stationary blades will be disturbed by displacement of the rotor or stator and the remaining blades will be held by their springs to maintain as nearly as possible the desired working clearance.

In order that the spring 15 may not be compelled to operate against the pressure of the motive fluid, series of holes 17 are provided in the stator, or in each base piece 6, which connect the undercut portion of each of the grooves 7 with the working passages of the turbine and admit motive fluid behind each base strip.

In some instances it may be desirable to so construct the base strips that there is no clearance between the turbine rotor and the ends of the stationary blades 5 and between the base strips 6 and the ends of the moving blades 4. Under such conditions the base strips will be yieldingly pressed against the outer or free ends of the blades 4 and the stationary blades 5 will be yieldingly held against the peripheral surface of the rotor until they are ground down and a minimum clearance is obtained.

The clearances may be adjusted from time to time by cutting down the shoulders formed by the undercut portions of the grooves 7.

Each blade, and I apply the term to include either the stationary or the rotating blades, is swaged at one end to encircle a calking piece 20, (shown in Fig. 7). The blade is cut at one side and near one end, as shown in Fig. 6, and a partially severed portion is distorted to encircle the calking piece and is pressed into gripping engagement therewith. The calking piece is provided with a top portion 21 of larger section than the main portion of the piece, and which projects beyond the encircling portion of the blade and engages the surface of the base strip as shown in Fig. 10, when the base portion is inserted in one of the blade mounting holes 8.

The holes 8 are countersunk on the under or inner side of each base strip and the inner end of each calking piece, which is adapted to project beyond the end of the blade and also through the base strip, is riveted over to fill the countersunk portion and thereby secure the blade in place.

In Figs. 8 and 9 I have shown a modified form of calking piece, which is simply a cylindrical block, so long that each end projects a predetermined amount beyond the encircling portion of the blade. The blades are secured in place in the holes 8 by this modified form of calking piece by transversely expanding the piece and thereby forcing the base portion into gripping contact with the wall of the hole 8 and by riveting over the projecting end of the piece to fill the countersunk portion of the hole.

A gaging slot 23 is provided for each blade and is cut into the peripheral face of each base strip and arranged to engage the edge formed on the undistorted portion of the blade in the operation of forming the mounting portion. In securing the blades to the blade strip the base portion is so located in the hole 8 that this undistorted edge extends into the gaging slot 23 and secures the blades against turning. The calking piece encircled by the mounting portion of the blade is then transversely expanded and the blade is rigidly secured to the base strip.

I have shown the rotating blades secured to base strips 25 which are mounted in transversely extending blade-mounting slots provided in the peripheral face of the rotor element. These blade strips may be secured in the slots by any suitable means, but I preferably employ compound tapered wedges 26, which are introduced into the slot in pairs, one wedge beside another, and which, when driven home, form a wedge shaped key which rigidly secures the strip in the slot and which, by its shape and the shape of its component wedges, is held securely against displacement.

Several pairs of wedges 25 are employed for securing one segmental base strip to the rotor element. The wedges are preferably so spaced within the slots that the ends of the wedges of one pair abut against the ends of the next adjacent pair and thereby prevent longitudinal displacement.

With such a construction, some special means must be employed for securing the compound wedges of the first and last pairs introduced into the slot against longitudinal motion.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination in a turbine, a base strip provided with alined blade-mounting holes, blades cut along one edge only to form mounting portions, a slot provided in said strip to receive the cut edge of said blade, and a separate calking piece for securing the base portion of each blade into one of said mounting holes.

2. In combination with a turbine blade-mounting element provided with a plurality of alined blade-mounting apertures, blades swaged at one end to form base portions and provided with a gaging edge adapted to engage a gaging recess formed in said strip, and means for securing each of said blades into one of said apertures.

3. In combination with a turbine blade mounting element provided with a plurality of alined blade-mounting apertures, blades, cut at one edge only and swaged to form a blade-mounting portion, and separate calking pieces for securing the blade-mounting portion of each blade into one of said apertures.

4. In combination with a turbine blade-carrying element provided with a blade-mounting slot, a base strip provided with a plurality of alined blade-mounting apertures and gaging recesses, blades, provided with swaged mounting portions and adapted to be secured into said blade-mounting apertures, a gaging edge formed on each blade and adapted to engage said recess, a laterally projecting circumferential flange formed on each strip, the means for securing said strip in said slot.

5. In combination with a turbine blade-carrying element provided with a blade-mounting slot, a base strip provided with a plurality of alined blade-mounting apertures, blades cut at one edge only and swaged to form a blade-mounting portion, a calking piece for securing the base portion of each blade into one of said apertures, and means for yieldingly securing said strip into said slot.

6. In combination in a turbine, a base strip provided with a plurality of blade-mounting apertures, blades cut at one edge only and swaged to encircle separate calking pieces, and a separate calking piece for securing each blade into one of said apertures.

7. In combination in a turbine, a base strip provided with a plurality of blade-mounting apertures and a laterally projecting circumferential flange, separate calking pieces for securing blades into said blade-mounting apertures, and blades cut at one edge only and swaged to encircle said calking pieces.

8. In combination in a turbine, a blade-mounting element provided with a plurality of blade-mounting apertures, blades cut at one edge only to form a blade-mounting portion, and means for securing each blade into one of said apertures.

9. A turbine blade cut transversely and bent longitudinally at one edge only to form a mounting portion.

10. A turbine blade cut at one edge only and having the partially severed portion swaged to encircle a calking piece.

11. A turbine blade cut at one edge only and having the partially severed portion swaged to form a mounting portion.

12. A turbine base strip provided with blade-mounting apertures and coöperating gaging slots adapted to receive turbine blades.

In testimony whereof, I have hereunto subscribed my name this 2nd day of October, 1908.

GEO. WESTINGHOUSE.

Witnesses:
H. C. TENER,
WM. H. CAPEL.

Copies of this patent may be obtained for five cents each, by addressing the "Commissioner of Patents, Washington, D. C."